US009568023B2

(12) United States Patent
Naruoka et al.

(10) Patent No.: US 9,568,023 B2
(45) Date of Patent: Feb. 14, 2017

(54) ENGINE WITH SUPERCHARGER

(71) Applicant: Kawasaki Jukogyo Kabushiki Kaisha, Hyogo (JP)

(72) Inventors: Shohei Naruoka, Kakogawa (JP); Hisatoyo Arima, Himeji (JP); Yoshiharu Matsuda, Akashi (JP); Yoshinobu Tanaka, Hyogo (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 109 days.

(21) Appl. No.: 14/591,810

(22) Filed: Jan. 7, 2015

(65) Prior Publication Data

US 2015/0118026 A1    Apr. 30, 2015

(30) Foreign Application Priority Data

Jul. 11, 2012    (JP) .................................. 2012-155462
Jul. 11, 2012    (JP) .................................. 2012-155463
Sep. 13, 2012    (JP) .................................. 2012-201406

(51) Int. Cl.
 *F02B 33/00*     (2006.01)
 *F02B 33/44*     (2006.01)
 (Continued)

(52) U.S. Cl.
 CPC ............. *F04D 29/668* (2013.01); *B62K 11/04* (2013.01); *F02B 33/40* (2013.01); *F02B 39/04* (2013.01);
 (Continued)

(58) Field of Classification Search
 CPC ........ F04D 29/054; B62K 11/00; B62K 11/04; F02B 61/02; F05D 2220/40; B62M 2701/0092
 (Continued)

(56) References Cited

U.S. PATENT DOCUMENTS 1,998,778 A * 4/1935 Gregg ..................... F02B 33/00
                                                         123/562
2,020,224 A * 11/1935 Waseige .................. F02B 33/00
                                                         123/562
(Continued)

FOREIGN PATENT DOCUMENTS

CN         102549250           7/2012
DE     102009038771 A1 *       3/2011    .............. F02B 39/04
(Continued)

OTHER PUBLICATIONS

Machine translation of Nonogaki Yoshiaki (Pub. Number JP 02-024284 A), published on Jan. 26, 1990.*
(Continued)

*Primary Examiner* — Thai Ba Trieu (57) ABSTRACT

A combustion engine (E) for a motorcycle includes a crankshaft (26) extending in a widthwise direction of the motorcycle and a supercharger (42) which pressurizes intake air (I). A clutch gear (72) to which a clutch is connected is provided at the right side of the crankshaft (26), and a supercharger gear (80) which drives the supercharger (42) is provided at the left side of the clutch gear (72). The supercharger gear (80) is formed on a crank web (75) disposed such that a journal (68) is located between the clutch gear (72) and the crank web (75).

16 Claims, 7 Drawing Sheets (51) Int. Cl.

| | | |
|---|---|---|
| *F04D 29/66* | (2006.01) | |
| *F02B 39/04* | (2006.01) | |
| *F02B 61/02* | (2006.01) | |
| *F02B 33/40* | (2006.01) | |
| *F02B 39/12* | (2006.01) | |
| *B62K 11/04* | (2006.01) | |
| *F04D 17/10* | (2006.01) | |
| *F04D 25/02* | (2006.01) | |
| *F04D 29/054* | (2006.01) | |

(52) U.S. Cl.
CPC .............. *F02B 39/12* (2013.01); *F02B 61/02* (2013.01); *F04D 17/10* (2013.01); *F04D 25/02* (2013.01); *F04D 29/054* (2013.01); *F05D 2220/40* (2013.01)

(58) Field of Classification Search
USPC ....... 123/559.1–559.3; 60/607–608; 180/218
See application file for complete search history.

(56) References Cited

U.S. PATENT DOCUMENTS

| | | | | |
|---|---|---|---|---|
| 2,058,440 | A * | 10/1936 | Gregg | F16D 47/02 192/103 A |
| 2,197,179 | A | 4/1940 | Hersey | |
| 2,209,884 | A * | 7/1940 | Halford | F16D 43/284 192/103 R |
| 2,222,294 | A * | 11/1940 | Hall | F02B 75/26 123/56.5 |
| 2,485,503 | A * | 10/1949 | Misch | F02B 67/00 123/561 |
| 2,756,735 | A * | 7/1956 | Oehrli | F02B 33/00 123/559.1 |
| 2,963,006 | A * | 12/1960 | Karde | F02B 33/00 123/559.1 |
| 4,475,617 | A * | 10/1984 | Minami | F02B 67/10 123/559.1 |
| 5,706,790 | A * | 1/1998 | Kemmler | F02B 33/446 123/564 |
| 5,911,211 | A * | 6/1999 | Uchida | F02B 33/36 123/559.1 |
| 7,082,932 | B1 * | 8/2006 | Crane | F02D 23/00 123/559.1 |
| 7,765,805 | B2 * | 8/2010 | Lofgren | F02B 39/04 123/559.1 |
| 8,707,931 | B2 | 4/2014 | Arima et al. | |
| 9,127,591 | B2 | 9/2015 | Arima et al. | |
| 9,303,603 | B2 * | 4/2016 | Naruoka | F02B 33/40 180/229 |
| 2012/0186565 | A1 | 7/2012 | Arima et al. | |
| 2012/0192839 | A1 | 8/2012 | Arima et al. | |
| 2015/0083513 | A1 * | 3/2015 | Ito | F02B 29/0418 180/229 |
| 2015/0101875 | A1 * | 4/2015 | Inayama | F02B 37/16 60/605.1 |
| 2015/0114365 | A1 * | 4/2015 | Naruoka | F02B 39/04 123/559.1 |
| 2015/0114744 | A1 * | 4/2015 | Naruoka | F02B 33/40 123/559.1 |
| 2015/0118025 | A1 * | 4/2015 | Naruoka | F02B 39/04 415/123 |
| 2015/0184585 | A1 * | 7/2015 | Naruoka | F02B 39/04 123/559.1 |
| 2015/0184586 | A1 * | 7/2015 | Tanaka | F02B 39/04 123/559.1 |
| 2016/0053860 | A1 * | 2/2016 | Arima | F16H 57/02 74/325 |

FOREIGN PATENT DOCUMENTS

| | | |
|---|---|---|
| JP | 02-006289 | 1/1990 |
| JP | 02-024284 | 1/1990 |
| JP | 02-042207 | 2/1990 |
| JP | 02-070920 | 3/1990 |
| JP | 02-163539 | 6/1990 |
| JP | 02188625 A * | 7/1990 |
| JP | 2011-132821 | 7/2011 |
| WO | 2011/046096 | 4/2011 |
| WO | WO2011/046098 | 4/2011 |

OTHER PUBLICATIONS

Machine translation of Isaka Yoshiharu (Pub. Number JP 02-042207 A), published on Feb. 13, 1990.*
Machine translation of Matsuda Yoshimoto (Pub. Number JP 2011-132821A), published on Jul. 7, 2011.*
Notification of Reason(s) for Rejection dated Feb. 2, 2016 for Japan Patent Application No. 2014-524841 with English Language Summary; 6 pages.
PCT/JP2013/068895 International Search Report, Aug. 27, 2013, 2 pages.
PCT Application No. PCT/JP2013/068895 International Preliminary Report on Patentability dated Jan. 22, 2015, 8 pages.
Notification of Reason(s) for Rejection Issued Jul. 5, 2016 for Corresponding Japanese Patent No. 2014-524841 with English Language Summary (5 pages).
First Office Action Issued Jun. 15, 2016 for Corresponding Chinese Patent Application No. 201380036265.0 with English Language Translation of the Search Report Attached to the Office Action (9 pages).
Extended and Supplementary Search Report Issued Jun. 17, 2016 for Corresponding European Patent Application No. 13816516.2 (7 pages).

* cited by examiner

ENGINE WITH SUPERCHARGER

CROSS REFERENCE TO THE RELATED APPLICATION

This application is a continuation application, under 35 U.S.C §111(a) of international application No. PCT/JP2013/068895, filed Jul. 10, 2013, which claims priority to Japanese patent application Nos. 2012-155462 and 2012-155463, filed Jul. 11, 2012, and Japanese patent application No. 2012-201406, filed Sep. 13, 2012, the entire disclosures of which are herein incorporated by reference as a part of this application.

BACKGROUND OF THE INVENTION

Field of the Invention

The present invention relates to a combustion engine which is mounted on a motorcycle and includes a crankshaft which extends in a widthwise direction of the motorcycle and a supercharger which pressurizes intake air.

Description of Related Art

As a combustion engine mounted on a motorcycle, a combustion engine has been known, in which a crankshaft extends in a widthwise direction of the motorcycle and a supercharger is driven by power extracted from the crankshaft and pressurizes intake air (e.g., Patent Document 1).

PRIOR ART LITERATURE

[Patent Document 1] WO2011/046096

In Patent Document 1, a discharge port of the supercharger is located in an end portion of a crankshaft. In addition, a further increase in output may be desired without increasing an engine capacity.

SUMMARY OF THE INVENTION

The present invention has been made in view of the above problem, and an object of the present invention is to provide a supercharger-equipped combustion engine which has an enhanced effect of output increase.

In order to achieve the above-described object, a first configuration of the present invention provides a combustion engine for a motorcycle, including: a crankshaft extending in a widthwise direction of the motorcycle; a supercharger configured to pressurize intake air; a clutch gear to be connected with a clutch and provided at one side of the crankshaft in the widthwise direction of the motorcycle; and a supercharger gear configured to drive the supercharger and provided at another side relative to the clutch gear.

According to this configuration, since the power for the supercharger is extracted from the inner side of the clutch gear disposed at the outer side in the widthwise direction of the motorcycle, namely, the center side of the motorcycle, it is easy to locate an outlet of the supercharger at a center portion of the combustion engine in the widthwise direction of the motorcycle. In addition, since it is possible to dispose the supercharger close to the center in the widthwise direction of the motorcycle, it is possible to reduce an amount by which the combustion engine protrudes at one side in the widthwise direction of the motorcycle, thereby reducing the restriction on the bank angle.

In the first configuration of the present invention, the supercharger gear is preferably formed on a crank web disposed such that one or more journals are located between the clutch gear and the crank web. According to this configuration, since the supercharger gear is disposed away from the clutch gear, it is further easy to dispose the supercharger close to the center of the motorcycle body in the widthwise direction. In addition, it is easy to dispose a power transmission mechanism, which transmits the power of the combustion engine to the supercharger, at the inner side of the clutch.

In the case where the supercharger gear is formed on the crank web away from the clutch gear, preferably, the supercharger-equipped combustion engine further includes: a first shaft body on which a driven-side supercharger gear configured to mesh with the supercharger gear is provided; and a first rotator disposed on the first shaft body and at the one side relative to the driven-side supercharger gear in the widthwise direction of the motorcycle, the first rotator being configured to rotate with the driven-side supercharger gear to transmit power of the combustion engine to the supercharger, in which case the first rotator is disposed between the driven-side supercharger gear and the clutch gear in the widthwise direction of the motorcycle. The first rotator is, for example, a sprocket, a gear, or a pulley. According to this configuration, since a space is defined between the supercharger gear and the clutch gear, it is easy to dispose the first rotator at the inner side of the clutch gear.

In the case where the first rotator is disposed between the driven-side supercharger gear and the clutch gear, preferably, the supercharger-equipped combustion engine further includes: a second rotator to which the power from the first rotator is transmitted; a second shaft body on which the second rotator is provided; and a supercharger rotation shaft of the supercharger, the supercharger rotation shaft being connected to the second shaft body, in which case the first rotator and the second rotator are disposed at the same position in the widthwise direction of the motorcycle, and the supercharger rotation shaft is disposed at the other side relative to the second rotator in the widthwise direction of the motorcycle. According to this configuration, a power transmission path leading from the supercharger gear to the supercharger rotation shaft is formed in substantially a U shape having two sides extending in the widthwise direction of the motorcycle. Thus, it is possible to lengthen the power transmission path while the power is extracted from the inner side of the clutch gear. Accordingly, it is easy to dispose a speed increaser, a transmission, a damper, a one-way clutch, and the like on the power transmission path.

In the case where the power transmission path is formed in substantially a U shape, it is possible to easily dispose a discharge port of the supercharger at a center position of the combustion engine in the widthwise direction of the motorcycle. In this case, it is possible to easily dispose a speed increaser including a planetary gear device between the second rotator and the supercharger rotation shaft.

In the case where the power transmission path is formed in substantially a U shape, it is possible to easily dispose a cushioning body configured to suppress rotation fluctuation, at one of both sides of the U shape, namely, between the first rotator and the driven-side supercharger gear or between the second rotator and the supercharger rotation shaft.

In the case where the power transmission path is formed in substantially a U shape, the supercharger gear is preferably connected to a third rotator disposed at the other side of the first shaft body in the widthwise direction of the motorcycle such that power is transmittable therebetween. The third rotator is connected to another rotating component such as a starter gear or a balancer. According to this configuration, it is possible to dispose the first rotator and the third rotator in a well-balanced manner by effectively using spaces at both sides of the driven-side supercharger gear in an axial direction. In addition, it is possible to prevent interference between the first rotator and the other component connected to the third rotator.

A second configuration of the present invention provides a combustion engine, for a motorcycle, including: a crankshaft extending in a widthwise direction of the motorcycle; a supercharger configured to pressurize intake air; a supercharger gear provided on a crank web inward of crank webs at both ends of the crankshaft in the widthwise direction of the motorcycle, the supercharger gear being configured to drive the supercharger; a first shaft body on which a driven-side supercharger gear configured to mesh with the supercharger gear is provided; a first rotator disposed on the first shaft body and at one side relative to the driven-side supercharger gear in the widthwise direction of the motorcycle, the first rotator being configured to rotate with the driven-side supercharger gear to transmit power of the combustion engine to the supercharger; a second rotator to which the power from the first rotator is transmitted; a second shaft body on which the second rotator is provided; and a supercharger rotation shaft of the supercharger connected to the second shaft body, in which case the first rotator and the second rotator are disposed at the same position in the widthwise direction of the motorcycle, the supercharger rotation shaft is disposed at the other side relative to the second rotator in the widthwise direction of the motorcycle, and a discharge port of the supercharger is located at a center position of the combustion engine in the widthwise direction of the motorcycle.

According to this configuration, a power transmission path leading from the supercharger gear to the supercharger rotation shaft is formed in substantially a U shape. Thus, it is possible to lengthen the power transmission path while the power is extracted from the inner side of the clutch gear. Accordingly, while a speed increaser, a transmission, a damper, a one-way clutch, and the like are disposed on the power transmission path, it is possible to easily a discharge port of the supercharger at a center portion of the combustion engine in the widthwise direction of the motorcycle.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A preferred embodiment of the present invention will now be described with reference to the accompanying drawings. The terms "left side" and "right side" used in the description in this specification are the left side and the right side relative to a motorcycle driver or motorcyclist maneuvering the motorcycle to travel forwards.

Figure 1:
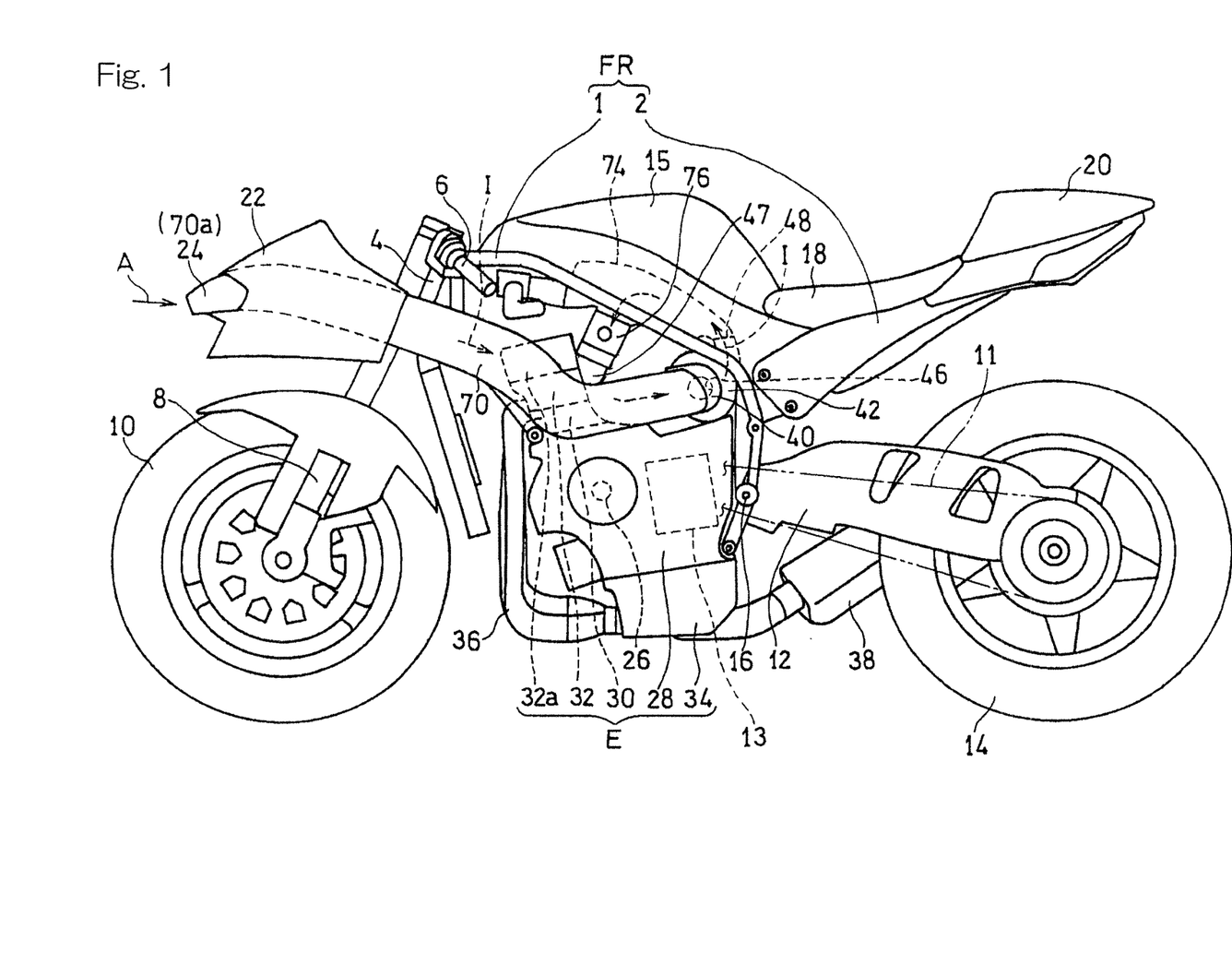
FIG. 1 is a side view showing a motorcycle equipped with a combustion engine according to a first embodiment of the present invention.

FIG. 1 is a side view of a motorcycle equipped with a combustion engine according to a first embodiment of the present invention. A motorcycle frame structure FR for the motorcycle includes a main frame 1 which forms a front half of the motorcycle frame structure FR, and a seat rail 2 which is mounted on a rear portion of the main frame 1 and forms a rear half of the motorcycle frame structure FR. A front fork 8 is rotatably supported by a head pipe 4 provided at a front end of the main frame 1 via a steering shaft (not shown), and a front wheel 10 is fitted to the front fork 8. A steering handle 6 is fixed to an upper end portion of the front fork 8.

Meanwhile, a swingarm 12 is supported by a rear end portion of the main frame 1, which is a lower intermediate portion of the motorcycle frame structure FR, via a pivot pin 16 for movement in up and down direction, and a rear wheel 14 is rotatably supported by a rear end portion of the swingarm 12. A combustion engine E is fitted to a lower portion of the main frame 1. Rotation of the combustion engine E is transmitted via a transmission 13 to a transmission mechanism 11 such as a chain disposed at the left side of the motorcycle, and the rear wheel 14 is driven via the transmission mechanism 11.

A fuel tank 15 is disposed on an upper portion of the main frame 1, and a driver's seat 18 and a fellow passenger's seat 20 are supported by the seat rail 2. Also, a front cowl 22 made of a resinous material is mounted on a front portion of the motorcycle frame structure FR so as to cover front of the head pipe 4. The front cowl 22 has an intake air inlet 24 through which intake air I is introduced from the outside to the combustion engine E.

The combustion engine E is a four-cylinder four-cycle type parallel multi-cylinder engine including a crankshaft 26 which is a rotation shaft extending in a widthwise direction of the motorcycle. The type of the combustion engine E is not limited thereto. The combustion engine E includes a crankcase 28 which supports the crankshaft 26, a cylinder block 30 which is connected to an upper portion of the crankcase 28, a cylinder head 32 which is connected to an upper portion of the cylinder block 30, a head cover 32a which is mounted on an upper portion of the cylinder head 32, and an oil pan 34 which is fitted to a lower portion of the crankcase 28. A rear portion of the crankcase 28 forms a transmission case which accommodates the transmission 13.

The cylinder block 30 and the cylinder head 32 are inclined slightly and frontward. Specifically, a piston axis of the combustion engine E is inclined frontward towards upside. A rear portion of the cylinder head 32 is provided with intake ports 47. Four exhaust pipes 36, fluid connected with exhaust ports in a front surface of the cylinder head 32, are merged together at a location beneath the combustion engine E, and are fluid connected with an exhaust muffler 38 disposed at the right side of the rear wheel 14. A supercharger 42, which takes in outside air as intake air and supplies the outside air to the combustion engine E, is disposed rearward of the cylinder block 30 and above the rear portion of the crankcase 28. That is, the supercharger 42 is located above the transmission 13.

The supercharger 42 compresses outside air sucked in through a suction port 46 thereof, to increase the pressure of the outside air, and then discharges the compressed air through a discharge port 48 thereof to supply the compressed air to the combustion engine E. Accordingly, it is possible to increase an amount of intake air supplied to the combustion engine E. The suction port 46 of the supercharger 42, which is opened leftward, is located above the rear portion of the crankcase 28, and the discharge port 48 which is opened upward is located at a center portion of the combustion engine E in the widthwise direction of the motorcycle.

Figure 2:
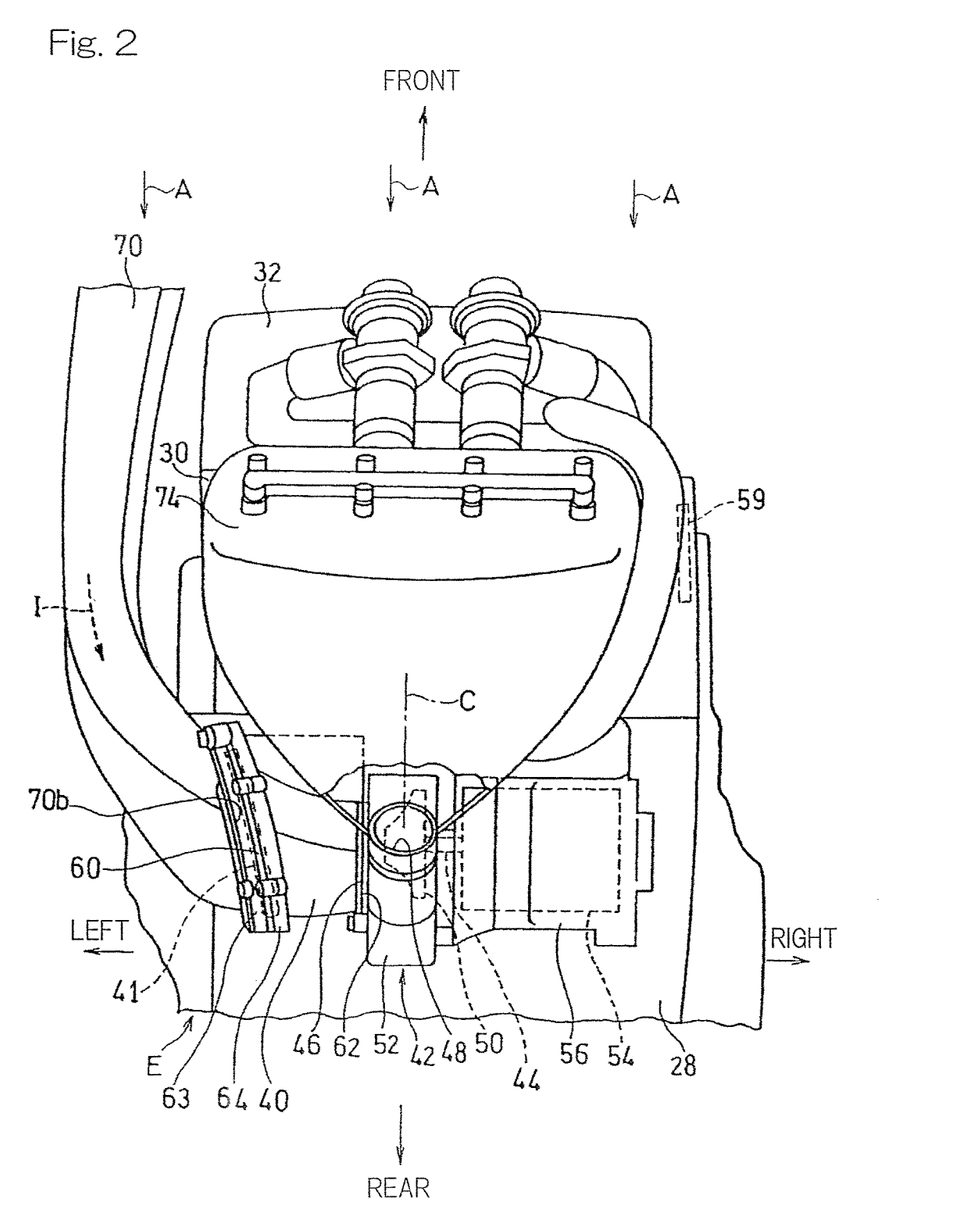
FIG. 2 is a perspective view of a principal part of the combustion engine as seen rearward obliquely from above.

As shown in FIG. 2, the supercharger 42 includes a supercharger rotation shaft 44 which extends in the widthwise direction of the motorcycle, an impeller 50 which is fixed to the supercharger rotation shaft 44, an impeller housing 52 which accommodates the impeller 50, a driving force transmission mechanism or speed increasing gear 54 which transmits power of the combustion engine E to the impeller 50, and a casing 56 which accommodates the driving force transmission mechanism 54 and a part of the supercharger rotation shaft 44. That is, the supercharger 42 is a centrifugal supercharger including the impeller 50. In the present embodiment, a speed increaser 54 composed of a planetary gear device described later is used as the driving force transmission mechanism 54. The speed increaser 54 and an air cleaner 40 are disposed in the widthwise direction of the motorcycle such that the impeller housing 52 is located therebetween. The impeller housing 52 is connected to the air cleaner 40 by means of bolts (not shown).

A cleaner outlet 62 of the air cleaner 40 is connected to the suction port 46 of the supercharger 42, and an intake duct 70 is connected to a cleaner inlet 60 of the air cleaner 40 from the outer side in the widthwise direction of the motorcycle, which intake duct 70 introduces incoming wind A flowing in front of the cylinder block 30 into the supercharger 42. The cleaner inlet 60 and a discharge port 60b of the intake duct 70 are connected to each other by connecting, by means of a plurality of bolts 55, connection flanges 63, 64 provided at outer peripheries of the cleaner inlet 60 and the discharge port 70b, respectively. A cleaner element 41 which cleans intake air I is provided between those connection flanges 63, 64.

An intake air chamber 74 is disposed between the discharge port 48 of the supercharger 42 and the intake ports 47 of the combustion engine E in FIG. 1. The intake air chamber 74 stores the intake air I to be supplied from the supercharger 42 to the intake ports 47. The intake air chamber 74 is disposed above the supercharger 42, and a most part thereof is located rearward of the cylinder block 30. As shown in FIG. 2, the discharge port 48 of the supercharger 42 is connected to a center portion of the intake air chamber 74 in the widthwise direction of the motorcycle. Thus, the intake air I from the supercharger 42 uniformly flows into a plurality of the intake ports 47 through the intake air chamber 74.

As shown in FIG. 1, a throttle body 76 is disposed between the intake air chamber 74 and the cylinder head 32. In the throttle body 76, a fuel is injected into the intake air to generate a fuel-air mixture, and the fuel-air mixture is supplied into cylinders. The fuel tank 15 is disposed above the intake air chamber 74 and the throttle body 76.

The intake duct 70 is supported by the main frame 1 such that a front end opening 70a thereof faces the intake air inlet 24 of the front cowl 22. The intake duct 70 increases the pressure of the incoming wind A introduced through the opening 70a, by a ram effect, and supplies the incoming wind A as intake air into the supercharger 42. The intake duct 70 is disposed at the left side of the motorcycle body, and extends from a location below a tip end portion of the handle 6 to a location outside the outer side of the cylinder block 30 and the cylinder head 32 of the combustion engine E in a side view.

A cam chain tunnel 59 which constitutes a part of a valve mechanism for an intake/exhaust valve is located at the right side in the widthwise direction of the motorcycle, and the intake duct 70 is disposed at the left side which is opposite to the cam chain tunnel 59. A clutch 71 (FIG. 3) is disposed at the right side which is the same side as the cam chain tunnel 59. Since the clutch 71 (FIG. 3) is disposed at the right side which is the same side as the cam chain tunnel 59, it is possible to form the combustion engine E in a compact size.

Figure 3:
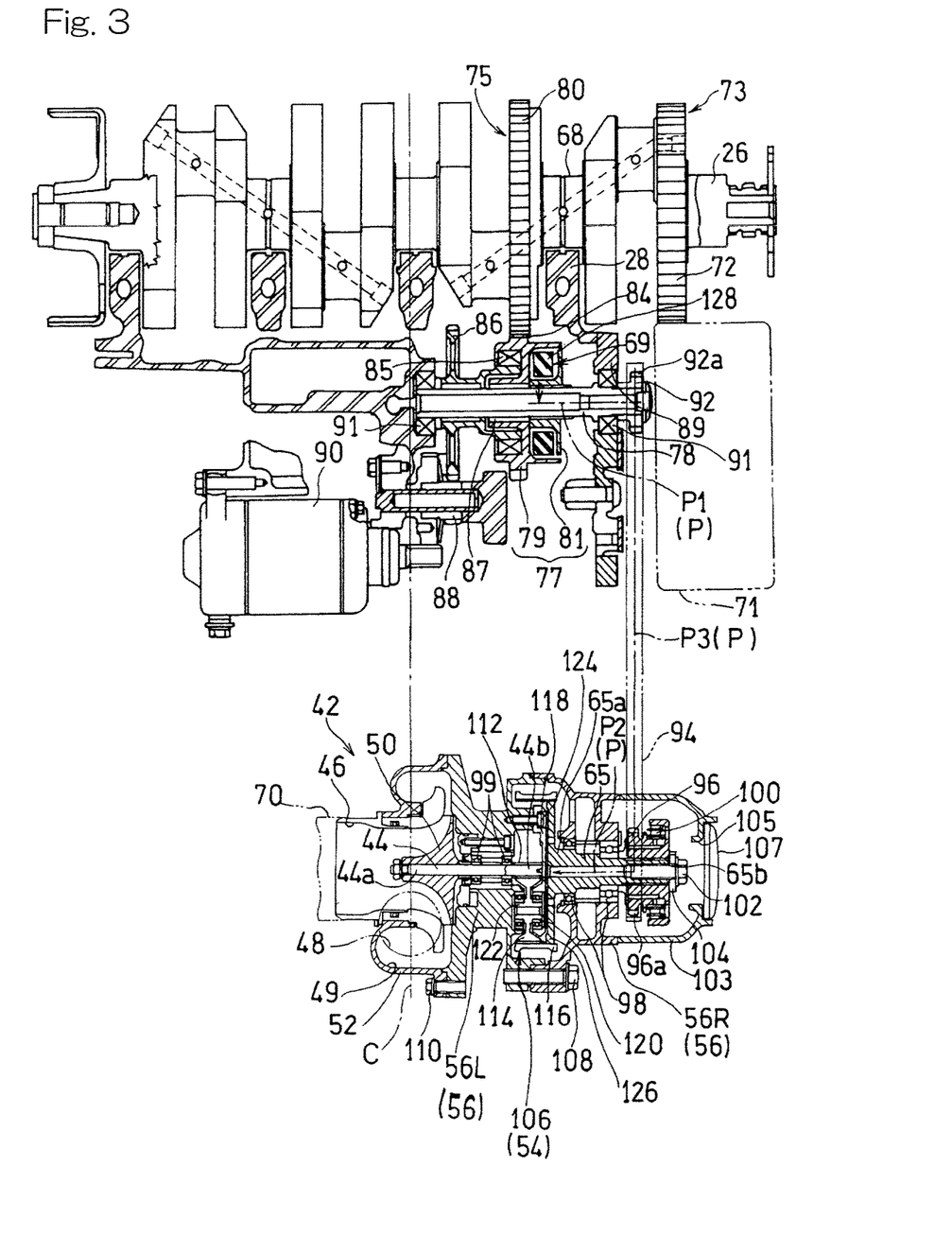
FIG. 3 is an axial arrangement diagram showing a drive system for a supercharger of the combustion engine.

As shown in FIG. 3, a clutch gear 72 to which the clutch 71 is connected is provided on an end portion, at the right side which is one side in the widthwise direction of the motorcycle, of the crankshaft 26 of the combustion engine E. A supercharger gear 80 which drives the supercharger 42 is provided on the crankshaft 26 at the left side of the clutch gear 72. Specifically, the clutch gear 72 is formed on the outer periphery of a crank web (No. 7 web) 73 which is the outermost side (right side) web of the crankshaft 26, and the supercharger gear 80 is formed on the outer periphery of a crank web (No. 6 web) 75 disposed at the left side of the clutch gear 72 such that a journal 68 is located therebetween. In the present embodiment, the supercharger gear 80 also serves as an idler gear configured to drive a balancer shaft (not shown) which rotates in a direction opposite to that of the crankshaft 26.

As such, the crank web which is similar in size to other crank webs is formed with teeth on the outer peripheral portion thereof, thereby to utilize the crank web as the clutch gear 72. Accordingly, contrary to the case where a dedicated clutch gear having a diameter smaller than that of a crank web is formed and connected with the use of a chain 94, it is not necessary to prevent interference between the chain 94 and a crank web, and it is possible to shorten the axial dimension of the crankshaft 26.

The supercharger gear 80 drives a supercharger drive shaft 78 which is a first shaft body having an axis parallel to the crankshaft 26. The supercharger drive shaft 78 is rotatably supported by a cassette transmission holder 89. The cassette transmission holder 89 is detachably mounted inward of the crankcase 28. The cassette transmission holder 89 is disposed at the inner side of the clutch 71 in the widthwise direction of the motorcycle, and supports the transmission 13 and the supercharger drive shaft 78. By detaching the cassette transmission holder 89, it is possible to easily mount and dismount the transmission 13 and the supercharger drive shaft 78 relative to the combustion engine E.

The supercharger drive shaft 78 is connected to the crankshaft 26 through a coupling 77. Specifically, the coupling 77 includes a coupling case 79 and a coupling cover 81. A driven-side supercharger gear 84 which meshes with the supercharger gear 80 is formed on the outer periphery of the coupling case 79, and the coupling case 79 is supported by the supercharger drive shaft 78 through a bearing 87 so as to be rotatable relative to the supercharger drive shaft 78. The coupling cover 81 is spline-fitted to the supercharger drive shaft 78 and rotates with the supercharger drive shaft 78.

The coupling case 79 and the coupling cover 81 are connected to each other in a rotation direction thereof through a first cushioning body 69. The first cushioning body 69 is provided on a power transmission path P leading from the crankshaft 26 to the supercharger rotation shaft 44, and suppresses rotation fluctuation of power. The supercharger drive shaft 78 is rotatably supported by bearings 91, 91 at opposite sides of the first cushioning body 69. Thus, as compared to the case where the first cushioning body 69 is supported only at one side thereof, it is easy to suppress rotation fluctuation of power transmission. The first cushioning body 69 will be described in detail later.

A starter gear 86 (third rotator) is supported at a left end portion of the supercharger drive shaft 78 so as to be rotatable relative to the supercharger drive shaft 78. Since the gear for a starter and the gear for supercharger drive are shared as described above, it is possible to reduce the number of components. A starter one-way clutch 85 is accommodated in the coupling case 79 and placed adjacent to the first cushioning body 69 in its axial direction, and connects the coupling case 79 and the starter gear 86. In other words, the starter one-way clutch 85 is provided between the driven-side supercharger gear 84 and the starter gear 86. A starter motor 90 is connected to the starter gear 86 through a torque limiter 88.

Accordingly, when the starter motor 90 rotates while the combustion engine E is at stoppage, the starter one-way clutch 85 is engaged, and starting torque is transmitted to the crankshaft 26. In addition, after start-up of the combustion engine E, when a rotation speed of the crankshaft 26 becomes higher than that of the starter motor 90, the starter one-way clutch 85 is disengaged to prevent power transmission from the crankshaft 26 to the starter motor 90. In this manner, the supercharger gear 80 and the starter gear 86 are connected such that power is transmittable therebetween. The first cushioning body 69 allows suppression of output fluctuation which occurs in the chain 94 when power is transmitted from the starter motor 90.

A first sprocket 92 which is a first rotator is provided at a right end portion of the supercharger drive shaft 78. A chain 94, which is an endless power transmission member which transmits power of the combustion engine E to the supercharger 42, is entrained on a gear 92a of the first sprocket 92. The first sprocket 92 is disposed between the driven-side supercharger gear 84 and the clutch gear 72 in the widthwise direction of the motorcycle. That is, the chain 94 is disposed at the inner side of the clutch 71 in the widthwise direction of the motorcycle and between the holder 89 and the clutch 71. When the chain 94 is formed so as to have a dimension equal to or smaller than that of a crankpin, it is easy to dispose the chain 94 at the inner side of the clutch 71 in the widthwise direction.

A rotational force of the crankshaft 26 is transmitted from the supercharger drive shaft 78 through the chain 94 to an input shaft 65 which is a second shaft body connected to the supercharger rotation shaft 44. Specifically, a second sprocket 96 that is a second rotator to which the power from the first sprocket 92 is transmitted is provided at a right end portion of the input shaft 65, and the chain 94 is entrained on a gear 96a of the second sprocket 96. The chain 94 is disposed at the right side which is opposite to the suction port 46 of the supercharger 42 and the transmission mechanism 11 (FIG. 1) for wheel drive in the widthwise direction of the motorcycle. The first and second sprockets 92, 96 are disposed at the same position in the widthwise direction of the motorcycle, and the supercharger rotation shaft 44 is disposed at the left side of the second sprocket 96.

The input shaft 65 is composed of a hollow shaft and is rotatably supported by the casing 56 through a bearing 98. Spline teeth are formed on the outer peripheral surface of the right end portion 65b of the input shaft 65. A speed increaser one-way clutch 100 is spline-fitted to the spline teeth of the outer peripheral surface, and the second sprocket 96 is connected to the input shaft 65 through the speed increaser one-way clutch 100.

The speed increaser one-way clutch 100 is provided on the power transmission path P and between the second sprocket 96 and the supercharger rotation shaft 44 and constitutes a second cushioning body which suppresses rotation fluctuation of power. The speed increaser one-way clutch 100 is disposed at the one side (at the right side) of the second sprocket 96 in the widthwise direction of the motorcycle. Thus, the dimension of the supercharger 42 in the widthwise direction of the motorcycle is prevented from being increased by the size of the speed increaser one-way clutch 100, and it is easy to locate the discharge port 48 at the center portion of the combustion engine E in the widthwise direction of the motorcycle. Since the speed increaser one-way clutch 100 is disposed at the axial end side relative to the second sprocket 96, it is possible to easily mount and dismount the speed increaser one-way clutch 100.

A second cushioning body or the speed increaser one-way clutch 100 has a clutch structure to release a connection between the upstream side and the downstream side when a rotation speed of the downstream side exceeds a rotation speed of the upstream side. Since the speed increaser one-way clutch 100 is disposed outward of the chain 94, it is easy to change the design of the speed increaser one-way clutch 100, and it is also easy to replace the speed increaser one-way clutch 100. However, the speed increaser one-way clutch 100 may be disposed inward of the chain 94.

An internal thread portion is formed on the inner peripheral surface of the right end portion 65b of the input shaft 65, and the speed increaser one-way clutch 100 is mounted on the right end portion 65b through a washer 104 with the use of a head portion of a bolt 102 screwed into the internal thread.

The speed increaser one-way clutch 100, the second sprocket 96, and the bolt 102 are accommodated in a sprocket cover 103 connected to a right end portion of the casing 56. The sprocket cover 103 has a right end portion formed with an opening 105 configured to face toward the outside of the motorcycle, and the opening 105 is closed by a cap 107.

The impeller 50 is fixed to a left end portion 44a of the supercharger rotation shaft 44 of the supercharger 42, and a right end portion 44b of the supercharger rotation shaft 44 is connected to a left end portion 65a of the input shaft 65 through a planetary gear device 106 which is the speed increaser 54.

The supercharger rotation shaft 44 is rotatably supported by the casing 56 through a bearing 99. The casing 56 includes an input shaft case portion 56R which supports the input shaft 65 and a rotation shaft case portion 56L which supports the supercharger rotation shaft 44, and the input shaft case portion 56R and the rotation shaft case portion 56L are connected to each other with the use of a casing fastening member 108 such as a bolt. Furthermore, the impeller housing 52 is connected to a left end portion of the casing 56 with the use of a housing fastening member 110 such as a bolt. The impeller housing 52 has the suction port 46 opened leftward and a discharge passage 49 formed so as to be connected to the discharge port 48 opened upward.

As described above, the planetary gear device 106 is disposed between the input shaft 65 and the supercharger rotation shaft 44 and is supported by the casing 56. External teeth 112 are formed on the right end portion 44b of the supercharger rotation shaft 44, and a plurality of planetary gears 114 are arranged in a circumferential direction and are gear-connected to or meshed with the external teeth 112. That is, the external teeth 112 of the supercharger rotation shaft 44 function as a sun gear of the planetary gear device 106. Furthermore, the planetary gears 114 are gear-connected to a large-diameter internal gear (ring gear) 116 at the outer side in a radial direction. Each planetary gear 114 is rotatably supported by a carrier shaft 122 through a bearing 120 mounted on the casing 56 and does not revolve around the carrier shaft 122.

The carrier shaft 122 includes a fixing member 118, and the fixing member 118 is fitted to the casing 56 by means of a bolt 124. That is, the carrier shaft 122 is fixed. An input gear 126 is provided on the left end portion 65a of the input shaft 65 and is gear-connected to the internal gear 116. As described above, the internal gear 116 is gear-connected so as to rotate in the same rotation direction as the input shaft 65, and the planetary gears 114, while the carrier shaft 122 is fixed, rotate in the same rotation direction as the internal gear 116. The sun gear (external gear 112) is formed on the supercharger rotation shaft 44 which is an output shaft, and rotates in a rotation direction opposite to that of the planetary gears 114. That is, the planetary gear device 106 increases the speed of rotation of the input shaft 65, and transmits the rotation, in the rotation direction opposite to that of the input shaft 65, to the supercharger rotation shaft 44.

The power transmission path P includes the supercharger gear 80, the driven-side supercharger gear 84, the coupling 77, the supercharger drive shaft 78, the first sprocket 92, the chain 94, the second sprocket 96, the speed increaser one-way clutch 100, the input shaft 65, and the speed increaser 54, and is formed in substantially a U shape having two sides P1, P2 parallel to the crankshaft 26 and a base P3 connecting both sides P1, P2. Specifically, rotation of the crankshaft 26 is transmitted via the driven-side supercharger gear 84 to the supercharger drive shaft 78. Then, rotation is transmitted from the first sprocket 92 at the right end of the supercharger drive shaft 78 to the input shaft 65 through the chain 94 extending in a direction perpendicular to the right-left direction, and is finally transmitted to the supercharger rotation shaft 44 disposed at the left side of the input shaft 65.

The discharge port 48 of the supercharger 42 is located so as to substantially coincide with a center position C of the combustion engine E in FIG. 2 in the widthwise direction of the motorcycle, namely, a center position C of the cylinder block 30 in the widthwise direction of the motorcycle. Specifically, in the case where the number of the cylinders of the combustion engine is an even number, the discharge port 48 is located in a region between cylinders at the one side in the widthwise direction of the motorcycle (right-side cylinders) and cylinders at the other side in the widthwise direction of the motorcycle (left-side cylinders). That is, the discharge port 48 is located in a region where a journal at the center in the widthwise direction of the motorcycle, of a plurality of crank journals, is disposed. On the other hand, in the case where the number of the cylinders of the combustion engine is an odd number, the discharge port 48 is located in a region of a central cylinder in the widthwise direction of the motorcycle. That is, the discharge port 48 is located in a region where a crankpin at the center in the widthwise direction of the motorcycle, of a plurality of crankpins, is disposed.

The first cushioning body 69 will be described. The first cushioning body 69 is disposed on the power transmission path P and at the upstream side of the first sprocket 92 in a power transmission direction, specifically, between the first sprocket 92 and the driven-side supercharger gear 84. In addition, the first cushioning body 69 is disposed between the clutch gear 72 and the supercharger gear 80 in the widthwise direction of the motorcycle. When one or more crank webs are provided between the clutch gear 72 and the supercharger gear 80, it is easy to ensure a space for disposing the first cushioning body 69. The first cushioning body 69 includes a plurality of elastic bodies 128 formed from rubber, and has a damper structure to transmit power from the upstream side to the downstream side thereof.

Figure 4:
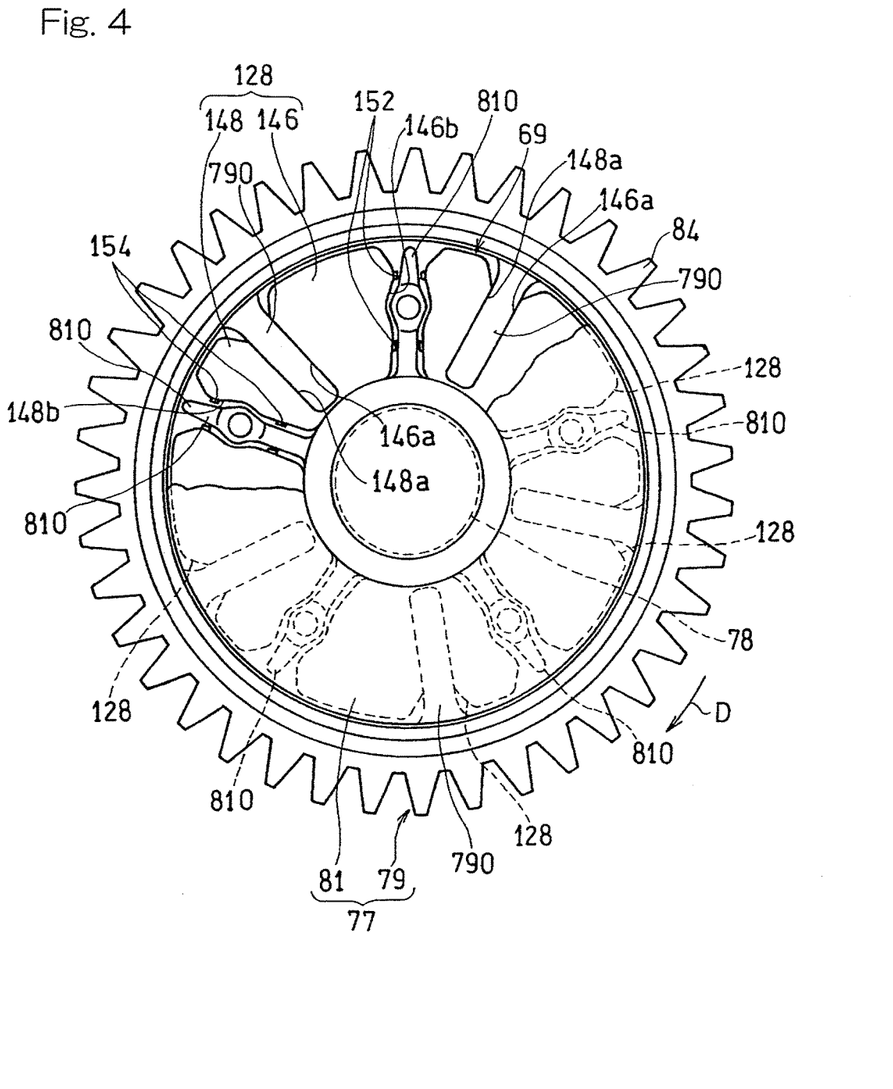
FIG. 4 is a side view of a coupling of the drive system for the supercharger.

The damper structure will be described. FIG. 4 is a side view of the coupling 77 as seen from a right side. As described above, the coupling 77 includes the coupling case 79, which is supported by the supercharger drive shaft 78 so as to be rotatable relative to the supercharger drive shaft 78, and the coupling cover 81, which rotates with the supercharger drive shaft 78, and the coupling 77 and the coupling cover 81 are connected to each other through the first cushioning body 69. FIG. 4 shows a state where a part of the coupling cover 81 is cut away.

Figure 5:
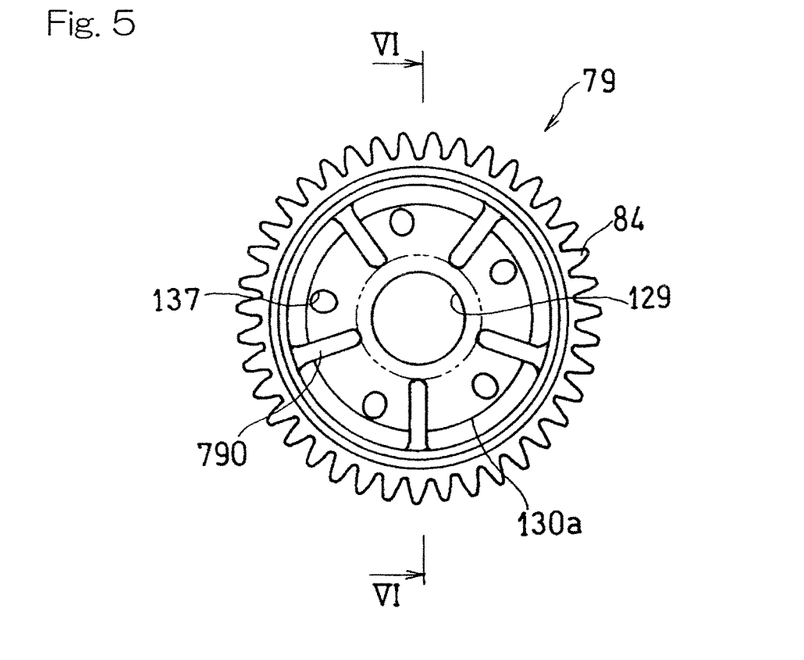
FIG. 5 is a side view of a coupling case of the coupling.
Figure 6:
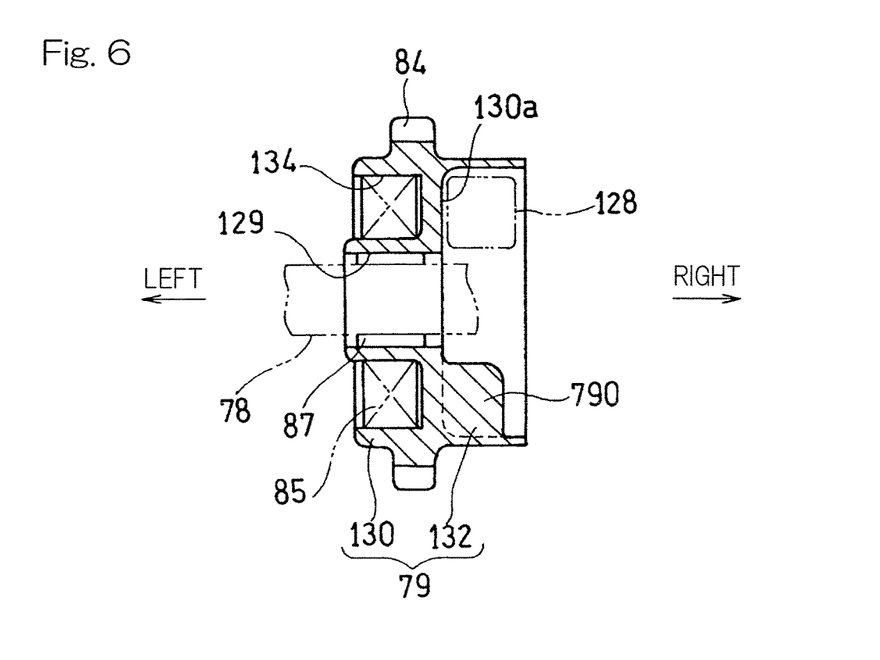
FIG. 6 is a cross-sectional view taken along a VI-VI line in FIG. 5.

FIG. 5 is a side view of the coupling case 79 as seen from a right side, and FIG. 6 is a cross-sectional view taken along a VI-VI line in FIG. 5. As shown in FIG. 6, the coupling case 79 includes an annular coupling gear portion 130 and a tubular damper housing portion 132 which projects rightward from the coupling gear portion 130. The driven-side supercharger gear 84 is formed on the outer diameter surface of the coupling gear portion 130. The coupling gear portion 130 is supported at an inner-diameter bearing ring portion 129 thereof by the supercharger drive shaft 78 through the needle bearing 87 so as to be rotatable relative to the supercharger drive shaft 78. The elastic bodies 128 are accommodated within the damper housing portion 132.

The coupling gear portion 130 has an annular one-way clutch housing recess 134 formed at the outer-diameter side of the bearing ring portion 129 and opened leftward. The starter one-way clutch 85 is accommodated in the one-way clutch housing recess 134. A right end surface 130a of the coupling gear portion 130 forms a bottom surface of the damper housing portion 132, and a plurality of engagement projections 790 are provided so as to project within the damper housing portion 132 at the right side.

As shown in FIG. 5, five engagement projections 790 radially extend and are provided so as to be spaced apart from each other in the circumferential direction at equal intervals. Furthermore, pin insertion holes 137 are formed as through holes in the right end surface 130a of the coupling gear portion 130. Specifically, five pin insertion holes 137 are also provided so as to be spaced apart from each other in the circumferential direction at equal intervals, and each pin insertion hole 137 is located between two engagement projections 790 adjacent to each other in the circumferential direction. The number of the engagement projections 790 and the number of the pin insertion holes 137 are not limited thereto.

Figure 7:
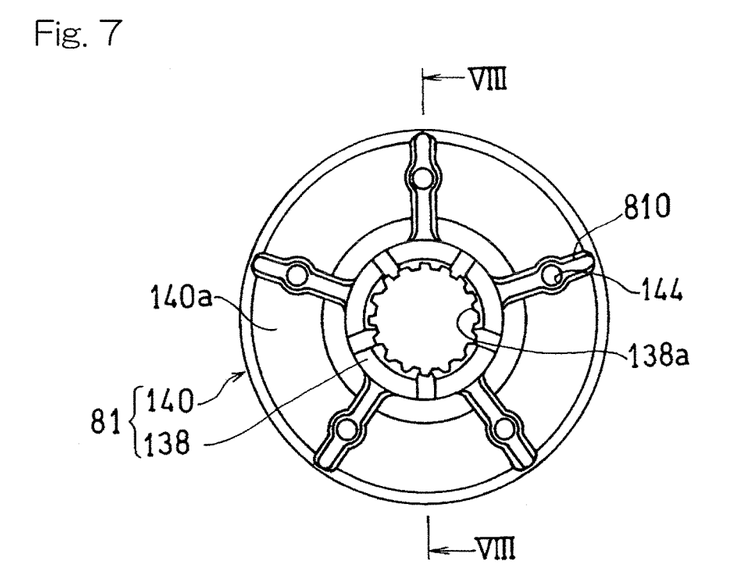
FIG. 7 is a side view of the coupling case of the coupling as seen from an opposite side to FIG. 5.
Figure 8:
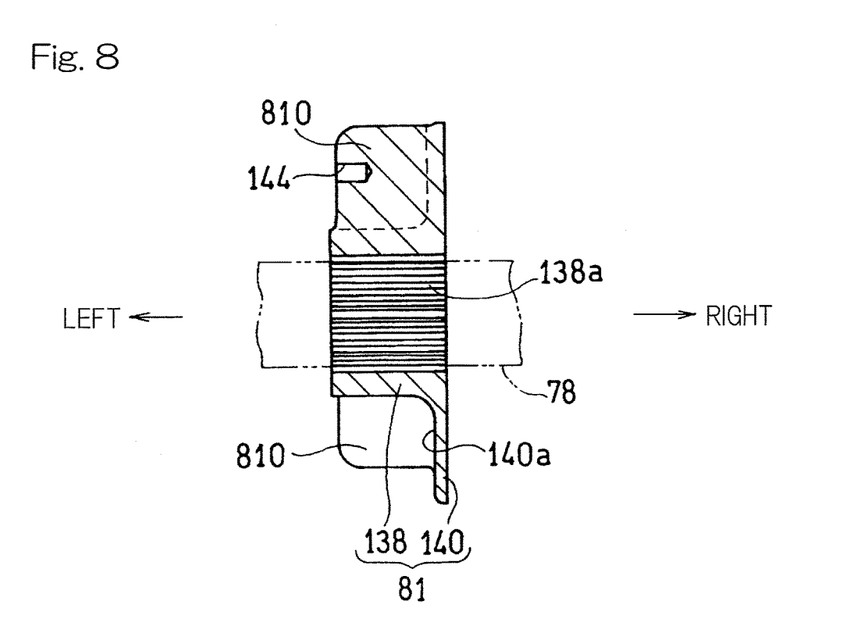
FIG. 8 is a cross-sectional view taken along a VIII-VIII line in FIG. 7.

FIG. 7 is a side view of the coupling cover 81 as seen from a left side, and FIG. 8 is a cross-sectional view taken along a VIII-VIII line in FIG. 7. As shown in FIG. 8, the coupling cover 81 includes: a tubular bearing portion 138 having spline teeth 138a which are formed in an inner-diameter surface thereof and spline-fitted to the supercharger drive shaft 78; and a flange-shaped cover portion 140 which is formed at a right end portion of the bearing portion 138 (an end portion opposite to the coupling case 79 in FIG. 3). A plurality of stopper portions 810 are formed on a left end surface 140a of the cover portion 140 so as to project leftward.

As shown in FIG. 7, five stopper portions 810 radially extend and are provided so as to be spaced apart from each other in the circumferential direction at equal intervals. A pin engagement hole 144 is formed at a tip end (left end) of each stopper portion 810 shown in FIG. 8 so as to be opened leftward. The pin engagement holes 144 are provided in positions corresponding to the respective pin insertion holes 137 of the coupling case 79 shown in FIG. 5.

Figure 9:
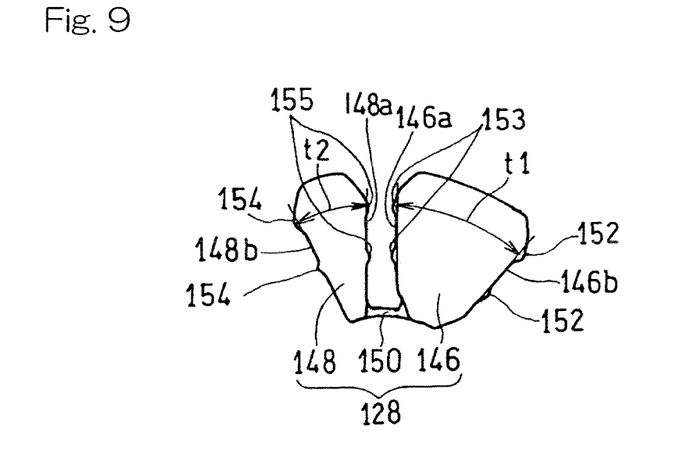
FIG. 9 is a side view of an elastic body of the coupling.

As shown in FIG. 4, five elastic bodies 128 constituting the first cushioning body 69 are disposed so as to be spaced apart from each other in the circumferential direction at equal intervals. FIG. 9 is a side view of one elastic body 128 as seen from a right side. Each elastic body 128 is formed from an elastic material such as rubber, and is formed from fluororubber in the present embodiment.

Each elastic body 128 includes an acceleration-side damper piece 146 which receives a rotational force during acceleration of the combustion engine, and a deceleration-side damper piece 148 which receives a rotational force during deceleration of the combustion engine, and a connection piece 150 through which both damper pieces 146 and 148 are connected to each other. A maximum thickness t1, measured in the circumferential direction, of the acceleration-side damper piece 146 excluding ribs 152 described later, is larger than a maximum thickness t2, measured in the circumferential direction, of the deceleration-side damper piece 148. Accordingly, the average of the thickness of the acceleration-side damper piece 146 which changes in the radial direction is also larger than that of the deceleration-side damper piece 148.

Respective engagement surfaces 146a, 148a of the acceleration-side damper piece 146 and the deceleration-side damper piece 148 which face each other in the circumferential direction are engaged with the engagement projection 790 of the coupling case 79 shown in FIG. 4. Surfaces of the acceleration-side damper piece 146 and the deceleration-side damper piece 148, which are opposite to the engagement surfaces 146a, 148a, respectively, in the circumferential direction, form load surfaces 146b, 148b each of which is brought into contact with the stopper portion 810 of the coupling cover 81 to receive a rotational force.

As shown in FIG. 9, the ribs 152, 154 are formed on the respective load surfaces 146b, 148b of the acceleration-side and deceleration-side damper pieces 146, 148, which receive a rotational force, so as to project in the circumferential direction. Two ribs 152 and two ribs 154 are provided so as to be spaced apart from each other in the radial direction and extend in the axial direction (the direction perpendicular to the surface of the sheet). Each of the number of the ribs 152 and the number of the ribs 154 may be two or more, or may be one. In addition, the number of the ribs 152 of the acceleration-side damper piece 146 and the number of the ribs 154 of the deceleration-side damper piece 148 may be different from each other. In the present embodiment, ribs 153, 155 are also formed on the engagement surfaces 146a, 148a, respectively.

Figure 10:
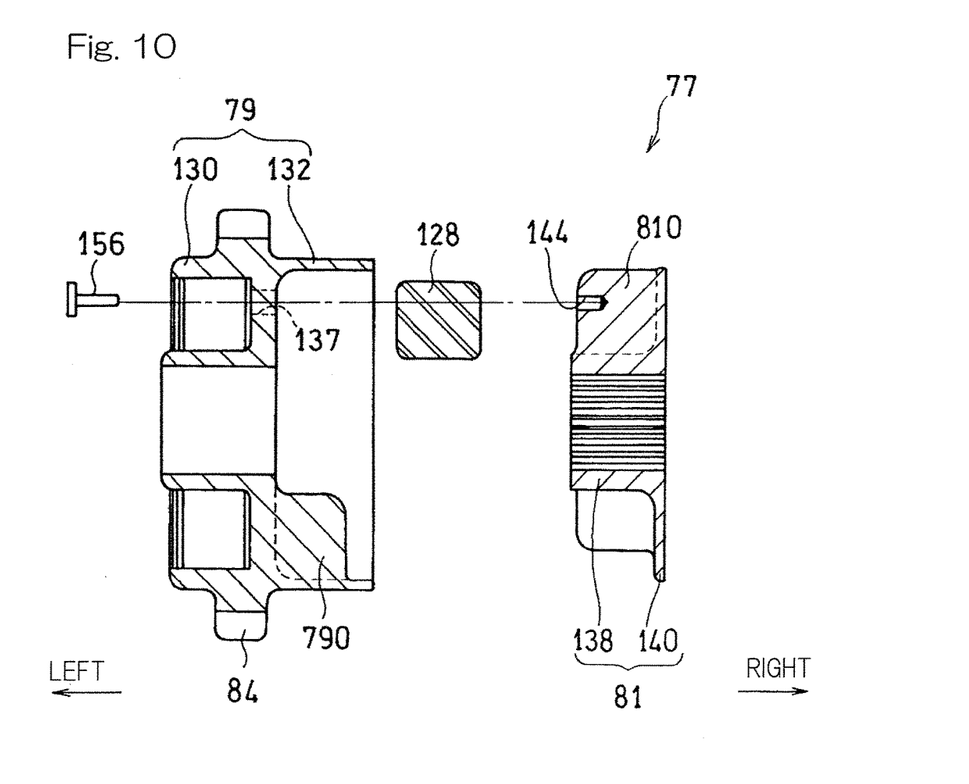
FIG. 10 is a cross-sectional view showing a method of assembling the coupling.

Now, a method of assembling the coupling 77 will be described with reference to FIGS. 4 and 10. First, the elastic bodies 128 are accommodated in the damper housing portion 132 of the coupling case 79 shown in FIG. 10. Specifically, the elastic bodies 128 are mounted such that the respective engagement surfaces 146a, 148a of the elastic bodies 128 are in contact with the engagement projections 790 of the coupling case 79 shown in FIG. 4.

Subsequently, the coupling cover 81 is assembled to the damper housing portion 132 of the coupling case 79 shown in FIG. 10. Specifically, the coupling cover 81 is mounted on the coupling case 79 such that each stopper portion 810 of the coupling cover 81 shown in FIG. 4 is disposed between the elastic bodies 128. In this state, the cover portion 140 of the coupling cover 81 shown in FIG. 10 prevents the elastic bodies 128 from coming off in the axial direction (rightward).

Finally, a pin 156 is inserted into each pin insertion hole 137 of the coupling case 79 from the left side to be engaged with the corresponding pin engagement hole 144 of the coupling cover 81. The pin 156 is mounted for preventing rotation, and the diameter of each pin insertion hole 137 is set so as to be larger than the outer diameter of the pin 156.

When the crankshaft 26 shown in FIG. 3 rotates, the supercharger drive shaft 78 rotates in conjunction with the crankshaft 26 because of the mesh of the supercharger gear 80 and the driven-side supercharger gear 84. Specifically, when the driven-side supercharger gear 84 of the coupling case 79 shown in FIG. 4 rotates in a D direction, the elastic bodies 128 engaged with the engagement projections 790 of the coupling case 79 also rotate together to come into contact with the stopper portions 810 of the coupling cover 81. Accordingly, the coupling cover 81 also rotates in the D direction, and the supercharger drive shaft 78, which is spline-fitted to the coupling cover 81, rotates. When the supercharger drive shaft 78 shown in FIG. 3 rotates, the input shaft 65 rotates through the chain 94, and further the supercharger rotation shaft 44 rotates through the planetary gear device 106, so that the supercharger 42 starts up.

When the motorcycle runs, the incoming wind A shown in FIG. 1 is introduced as the intake air I through the intake air inlet 24 to the intake duct 70. Such incoming wind A introduced is pressurized within the intake duct 70 by a ram pressure, and then is, after cleaned by the air cleaner 40, introduced into the supercharger 42. The intake air I introduced into the supercharger 42 is pressurized by the supercharger 42 and is introduced into the combustion engine E through the intake air chamber 74 and the throttle body 76. Because of a synergetic effect of the pressurization by the ram pressure and the pressurization by the supercharger 42 as described above, it is possible to supply high-pressure intake air to the combustion engine E.

When the combustion engine E rapidly accelerates, the engagement projections 790 of the coupling case 79 shown in FIG. 4 also rapidly increase rotational speed, and the load surfaces 146b of the acceleration-side damper pieces 146 of the elastic bodies 128 come into contact with the stopper portions 810 of the coupling cover 81 with a great rotational force in the D direction so that the elastic bodies are largely deformed in the circumferential direction. Because of the deformation, it is possible to prevent a great rotational impact force from being transmitted to the downstream side of each elastic body 128 in the D direction which is the power transmission direction.

When each acceleration-side damper piece 146 collides against the stopper portion 810, the ribs 152 initially contact the stopper portion 810, and then a main body of the acceleration-side damper piece 146 contacts the stopper portion 810. Because of the two-stage collision as described above, a cushioning effect is enhanced, thereby allowing the gears at the downstream side or the gear and the chain to smoothly contact each other.

In addition, when the combustion engine rapidly decelerates or abruptly stops, even if the crankshaft 26 shown in FIG. 3 has decelerated or stopped, the supercharger 42 is apt to continue to rotate by inertia. However, when the rotation speed of the input shaft 65 becomes higher than the rotation speed of the supercharger drive shaft 78, the speed increaser one-way clutch 100 is disengaged. As a result, the rotation of the supercharger 42 is not transmitted to the crankshaft 26.

Meanwhile, in the first cushioning body 69, whereas the coupling case 79, which is gear-connected to the crankshaft 26, has decelerated or stopped, whereas the supercharger drive shaft 78 and the coupling cover 81, which rotates with the supercharger drive shaft 78, attempt to continue to rotate by an inertia force. That is, the stopper portions 810 of the coupling cover 81 shown in FIG. 4 rotate in the D direction, and the coupling case 79 and the elastic bodies 128, which are mounted on the coupling case 79, have decelerated or stopped. Thus, the stopper portions 810 of the coupling cover 81 come into contact with the load surfaces 148b of the deceleration-side damper pieces 148 of the elastic bodies 128 with a rotational force in the D direction, and the deceleration-side damper pieces 148 is rendered to be deformed in the circumferential direction. Because of the deformation, it is possible to prevent the rotation of the supercharger drive shaft 78 from being transmitted to the crankshaft 26.

Here, the rotational force of the coupling case 79 in the D direction during acceleration is much great as compared to the rotational force of the coupling cover 81 in the D direction during deceleration. As shown in FIG. 9, since the thickness of the acceleration-side damper piece 148 which receives the great rotational force is larger, an amount of deformation of the elastic body 128 is increased, and thus it is possible to effectively absorb the rotational force.

In addition, a combustion engine for a motorcycle has low rotational inertia as compared to a general-purpose small-size combustion engine, and thus torque fluctuation is likely to occur. In the present embodiment, the first cushioning body 69 is operable to absorb the torque fluctuation.

In the configuration described above, power for the supercharger 42 shown in FIG. 3 is extracted from the supercharger gear 80 at the inner side of the clutch gear 72 (at the center side of the motorcycle) disposed outward in the widthwise direction of the motorcycle, it is possible to locate the discharge port 48 of the supercharger 42 near the center position C of the combustion engine E in the widthwise direction of the motorcycle. In addition, since it is possible to dispose the supercharger 42 close to the center in the widthwise direction of the motorcycle, it is possible to reduce an amount by which the combustion engine E protrudes at one side in the widthwise direction of the motorcycle, thereby reducing the restriction on the bank angle.

Moreover, the supercharger gear 80 is formed on the crank web 75 disposed close to the center relative to the clutch gear 72 such that the journal 68 is located between the clutch gear 72 and the crank web 75. Accordingly, the supercharger gear 80 is disposed away from the clutch gear 72, and thus it is further easy to dispose the supercharger 42 close to the center. In addition, it is easy to dispose the speed increaser 54 at the inner side of the clutch gear 72.

Furthermore, the first sprocket 92 is disposed between the supercharger gear 80 and the clutch gear 72 in the widthwise direction of the motorcycle. The supercharger gear 80 is disposed such that the journal 68 is located between the clutch gear 72 and the supercharger gear 80, and therefore, a space is secured between the supercharger gear 80 and the clutch gear 72. Thus, it is easy to dispose the first sprocket 92 at the inner side of the clutch gear 72.

Moreover, the first sprocket 92 and the second sprocket 96 are disposed at the same position in the widthwise direction of the motorcycle, and the supercharger rotation shaft 44 is disposed at the left side of the first sprocket 96 in the widthwise direction of the motorcycle. Thus, the power transmission path P is formed in substantially a U shape, and hence it is possible to lengthen the power transmission path P while power is extracted from the inner side of the clutch gear 72. As a result, it is possible to easily locate the discharge port 48 of the supercharger 42 near the center position C of the combustion engine E in the widthwise direction of the motorcycle, and it is also easy to dispose the speed increaser 54, the first cushioning body 69, and the speed increaser one-way clutch 100 on the power transmission path P.

Furthermore, the supercharger gear 80 is connected to the starter gear 86 disposed at the left side in the widthwise direction of the motorcycle, such that power is transmittable therebetween. Thus, it is possible to dispose the first sprocket 92 and the starter gear 86 in a well-balanced manner by effectively using spaces at opposite sides of the driven-side supercharger gear 84 in the axial direction. Also, it is possible to prevent interference between the first sprocket 92 and the starter motor 90 connected to the starter gear 86.

Since the first and second cushioning bodies 69, 100, which suppress rotation fluctuation, are disposed on the power transmission path P, it is possible to prevent great transmission force fluctuation (torque fluctuation) in the rotation direction from occurring in the supercharger 42. Accordingly, it is possible to prevent the supercharger 42 from being damaged.

Furthermore, since the first and second cushioning bodies 69, 100 are provided on the power transmission path P and at the upstream side of the speed increaser 54 in the power transmission direction, it is possible to prevent great transmission force fluctuation in the rotation direction from occurring in the speed increaser 54. Accordingly, it is possible to prevent the speed increaser 54 from being damaged.

In addition, since the first cushioning body 69 is provided on the power transmission path P and at the upstream side of the chain 94 in the power transmission direction, it is possible to suppress fluctuation in torque to be transmitted to the chain 94, and also to prevent great transmission force fluctuation in the pulling direction from occurring in the chain 94. Moreover, it is possible to suppress rotation fluctuation on the power transmission path P by both the chain 94 and the first cushioning body 69.

Furthermore, the first cushioning body 69 having the damper structure is disposed at the upstream side, in the power transmission direction, of the second cushioning body 100 composed of the speed increaser one-way clutch 100. Therefore, the first and second cushioning bodies 69, 100 are able to prevent both pulsation of the combustion engine and a counter flow of power transmission. Since the first cushioning body 69 has the damper structure, the first cushioning body 69 is also able to suppress minute rotation fluctuation by a damper effect.

Pulsation of the combustion engine occurs due to explosion strokes being repeated at time intervals, and is periodically repeated even when the rotation speed of the combustion engine is constant. By the damper effect of the first cushioning body 69, it is possible to prevent fluctuations on both an output increase side and an output deceleration side, and it is also possible to suppress pulsation with a relatively small fluctuation range.

In addition, the speed increaser one-way clutch 100 is able to prevent power fluctuation which occurs due to change in the rotation speed of the combustion engine E. The power fluctuation occurs due to an accelerator operation, a brake operation, a clutch operation, a gear shift operation, or the like during acceleration, deceleration, or the like. Accordingly, there is a low possibility that such a power fluctuation will occur, when the rotation speed of the combustion engine is constant. That is, the power fluctuation is an aperiodic and impulsive change. The speed increaser one-way clutch 100 is able to suppress pulsation with a relatively large fluctuation range.

In addition, the first cushioning body 69 is provided at the upstream side of the chain 94 in the power transmission direction, and the second cushioning body 100 is provided at the downstream side of the chain 94 in the power transmission direction and at the upstream side of the speed increaser 54 in the power transmission direction. Therefore, the two cushioning bodies 69, 100 are able to further effectively prevent great transmission force fluctuation, and also, the second cushioning body 100 having the clutch structure is able to prevent power from being transmitted from the chain 94 to the combustion engine E during rapid deceleration of the combustion engine. Accordingly, it is possible to suppress fluctuation in rotation of the combustion engine.

The driven-side supercharger gear 84 is provided on the outer periphery of the coupling 77, and both the starter one-way clutch 85 and the first cushioning body 69 are accommodated in the coupling 77. Therefore, since compactification is achieved, it is possible to simplify an area around the combustion engine, and it is also easy to dispose the coupling 77 within the combustion engine E. Since the first cushioning body 69 is disposed within the combustion engine E, it is also possible to prevent rotation fluctuation from being transmitted to a balancer shaft (not shown) on which an idler gear (not shown) configure to mesh with the driven-side supercharger gear 84 is provided. As a result, a load on a bearing for the balancer shaft is reduced, and it is possible to reduce the size of the bearing.

In addition, since the supercharger drive shaft 78 is supported by the cassette transmission holder 89 which is detachably mounted on the crankcase 28, it is possible to easily access the first cushioning body 69 by detaching the cassette transmission holder 89, and as a result, maintenance such as replacement of each elastic body 128 is easy.

Furthermore, since the first cushioning body 69 is disposed between the clutch gear 72 and the supercharger gear 80 in the widthwise direction of the motorcycle, it is possible to prevent interference between the first cushioning body 69 and the clutch 71.

The supercharger gear 80 is formed such that the one journal 68 is located between the clutch gear 72 shown in FIG. 3 and the supercharger gear 80, and the power transmission path P leading to the supercharger 42 is formed at the right side of the supercharger gear 80 in the widthwise direction of the motorcycle. Thus, while the chain 94 is disposed at the back side (inner side) of the clutch 71, it is possible to locate the power transmission path P1, which leads from the supercharger gear 80 to the chain 94, between the supercharger gear 80 and the clutch gear 72.

Moreover, the second sprocket 96, the speed increaser 54, and the impeller 50 are aligned in a line along the widthwise direction of the motorcycle. That is, a structure is formed in which a power input position (the second sprocket 96) of the supercharger 42 and the discharge port 48 (the impeller 50) of the supercharger 42 are away from each other in the widthwise direction of the motorcycle. However, in the present embodiment, since the power input position of the supercharger 42 is located at the one side (the right side) in the widthwise direction of the motorcycle, although the power input position and the discharge port 48 of the supercharger 42 are away from each other in the widthwise direction of the motorcycle, it is possible to locate the discharge port 48 near the center C of the combustion engine. That is, the chain 94 and the second sprocket 96, which are part of the power transmission path to the supercharger 42, are disposed at the one side in the widthwise direction of the motorcycle. Accordingly, the speed increaser 54 is also disposed at the one side in the widthwise direction of the motorcycle, and as a result, it is easy to locate the discharge port 48 close to the center in the widthwise direction of the motorcycle.

The present invention is not limited to the embodiment described above, and various additions, modifications, or deletions may be made without departing from the gist of the invention. For example, in the embodiment described above, the first sprocket 92 is used as the first rotator, but the first rotator may be a gear or a pulley. In addition, the chain 94 is used as the endless power transmission member which transmits the power of combustion engine E to the supercharger 42, but the endless power transmission member may be a belt.

In the embodiment described above, the clutch gear 72 is formed at a portion of the end portion of the crankshaft 26 on the one side (right side) in the widthwise direction of the motorcycle which portion is adjacent to the crank journal, but the clutch gear 72 is not limited thereto as long as the clutch gear 72 is disposed at the one side of the crankshaft 26 in the widthwise direction of the motorcycle. For example, a clutch gear may be formed at a crank arm closer to the center in the widthwise direction of the motorcycle than a crankpin at one end of the crankshaft 26 in the widthwise direction of the motorcycle.

Furthermore, in the embodiment described above, the first cushioning body 69 is provided at the upstream side of the chain 94 in the power transmission direction and the second cushioning body 100 is provided at the downstream side of the chain 94 and at the upstream side of the speed increaser 54 in the power transmission direction, but at least one cushioning body may be provided on the power transmission path P. In addition, each cushioning body may have at least one of a damper structure and a clutch structure. Therefore, these are construed as included within the scope of the present invention.

REFERENCE NUMERALS

26 . . . crankshaft
42 . . . supercharger
44 . . . supercharger rotation shaft
48 . . . discharge port
54 . . . speed increaser (planetary gear device)

65 . . . input shaft (second shaft body)
68 . . . journal
69 . . . first cushioning body
72 . . . clutch gear
75 . . . crank web
78 . . . supercharger drive shaft (first shaft body)
80 . . . supercharger gear
84 . . . driven-side supercharger gear
86 . . . starter gear (third rotator)
92 . . . first sprocket (first rotator)
96 . . . second sprocket (second rotator)
100 . . . speed increaser one-way clutch (second cushioning body)
E . . . combustion engine
I . . . intake air

What is claimed is:

1. A supercharger-equipped combustion engine for a motorcycle, the combustion engine comprising:
   a crankshaft extending in a widthwise direction of the motorcycle, the crankshaft having one end portion at one side in the widthwise direction and the other end portion at the other side in the widthwise direction;
   a supercharger configured to pressurize intake air;
   a clutch gear to be connected with a clutch and provided at the one side of the crankshaft in the widthwise direction of the motorcycle;
   a supercharger gear configured to drive the supercharger and provided at the other side relative to the clutch gear, the supercharger gear being disposed on a crank web including one or more journals being located between the clutch gear and the crank web;
   a first shaft body on which a driven-side supercharger gear configured to mesh with the supercharger gear is provided; and
   a first rotator disposed on the first shaft body and at the one side relative to the driven-side supercharger gear in the widthwise direction of the motorcycle, the first rotator being configured to rotate with the driven-side supercharger gear to transmit power of the combustion engine to the supercharger,
      wherein the first rotator is disposed between the driven-side supercharger gear and the clutch gear in the widthwise direction of the motorcycle.

2. The supercharger-equipped combustion engine as claimed in claim 1, further comprising:
   a second rotator to which the power from the first rotator is transmitted;
   a second shaft body on which the second rotator is provided; and
   a supercharger rotation shaft of the supercharger, the supercharger rotation shaft being connected to the second shaft body, wherein
   both of the first rotator and the second rotator are simultaneously disposed at the one side or at the other side in the widthwise direction of the motorcycle, and
   the supercharger rotation shaft is disposed at the other side relative to the second rotator in the widthwise direction of the motorcycle.

3. The supercharger-equipped combustion engine as claimed in claim 2, wherein
   a discharge port of the supercharger is located at a center position of the combustion engine in the widthwise direction of the motorcycle.

4. The supercharger-equipped combustion engine as claimed in claim 2, further comprising a speed increaser including a planetary gear device, the speed increaser being disposed between the second rotator and the supercharger rotation shaft.

5. The supercharger-equipped combustion engine as claimed in claim 2, further comprising a cushioning body configured to suppress rotation fluctuation, the cushioning body being disposed between the first rotator and the driven-side supercharger gear or between the second rotator and the supercharger rotation shaft.

6. The supercharger-equipped combustion engine as claimed in claim 2, wherein the supercharger gear is connected to a third rotator disposed at the other side of the first shaft body in the widthwise direction of the motorcycle such that power is transmittable therebetween.

7. The supercharger-equipped combustion engine as claimed in claim 6, wherein the third rotator comprises a starter gear configured to connect a starter motor, or balancer gear configured to connect another rotating component.

8. The supercharger-equipped combustion engine as claimed in claim 1, wherein the supercharger is disposed rearwardly of a cylinder block.

9. The supercharger-equipped combustion engine as claimed in claim 8, wherein the supercharger is disposed at an upper portion of a crankcase.

10. The supercharger-equipped combustion engine as claimed in claim 1, wherein the supercharger is disposed above the crankshaft.

11. The supercharger-equipped combustion engine as claimed in claim 1, further comprising an endless power transmission member configured to transmit power of the crankshaft into the supercharger, the endless power transmission member being disposed on an inner side of the clutch in the widthwise direction.

12. The supercharger-equipped combustion engine as claimed in claim 1, wherein the first rotator comprises one of a sprocket, a gear or a pulley.

13. A supercharger-equipped combustion engine for a motorcycle, the combustion engine comprising:
   a crankshaft extending in a widthwise direction of the motorcycle, the crankshaft having one end portion at one side in the widthwise direction and the other end portion at the other side in the widthwise direction;
   a supercharger configured to pressurize intake air;
   a clutch gear to be connected with a clutch and provided at the one side of the crankshaft in the widthwise direction of the motorcycle;
   a supercharger gear configured to drive the supercharger and provided at the other side relative to the clutch gear;
   a first shaft body on which a driven-side supercharger gear configured to mesh with the supercharger gear is provided; and
   a first rotator disposed on the first shaft body and at the one side relative to the driven-side supercharger gear in the widthwise direction of the motorcycle, the first rotator being configured to rotate with the driven-side supercharger gear to transmit power of the combustion engine to the supercharger, wherein
   the first shaft body is disposed on an inner side of the clutch gear in the widthwise direction, and
   the supercharger gear is disposed on an outer side of the driven-side supercharger gear in the widthwise direction.

14. The supercharger-equipped combustion engine as claimed in claim 13, wherein the first rotator comprises one of a sprocket, a gear or a pulley.

15. A supercharger-equipped combustion engine for a motorcycle, the combustion engine comprising:
- a crankshaft extending in a widthwise direction of the motorcycle, the crankshaft having one end portion at one side in the widthwise direction and the other end portion at the 5 other side in the widthwise direction;
- a supercharger configured to pressurize intake air;
   - a supercharger gear provided on a crank web inward of crank webs at both ends of the crankshaft in the widthwise direction of the motorcycle, the supercharger gear being configured to drive the supercharger;
- a first shaft body on which a driven-side supercharger gear configured to mesh with the supercharger gear is provided;
- a first rotator disposed on the first shaft body and at one side relative to the driven-side supercharger gear in the widthwise direction of the motorcycle, the first rotator being configured to rotate with the driven-side supercharger gear to transmit power of the combustion engine to the supercharger;
- a second rotator to which the power from the first rotator is transmitted;
- a second shaft body on which the second rotator is provided; and a supercharger rotation shaft of the supercharger, connected to the second shaft body, wherein
   - both of the first rotator and the second rotator are simultaneously disposed at the one side or at the other side in the widthwise direction of the motorcycle,
   - the supercharger rotation shaft is disposed at the other side relative to the second rotator in the widthwise direction of the motorcycle, and
   - a discharge port of the supercharger is located at a center position of the combustion engine in the widthwise direction of the motorcycle.

16. The supercharger-equipped combustion engine as claimed in claim 15, wherein the first and second rotators comprise one of a sprocket, a gear or a pulley.

* * * * *

UNITED STATES PATENT AND TRADEMARK OFFICE
CERTIFICATE OF CORRECTION

PATENT NO. : 9,568,023 B2  Page 1 of 1
APPLICATION NO. : 14/591810
DATED : February 14, 2017
INVENTOR(S) : Shohei Naruoka et al.

It is certified that error appears in the above-identified patent and that said Letters Patent is hereby corrected as shown below:

On the Title Page

After Item (65) please insert:
--Related U.S. Application Data
(63)  Continuation of application No. PCT/JP2013/068895, filed on Jul 10, 2013.--

Signed and Sealed this
Ninth Day of May, 2017

Michelle K. Lee
*Director of the United States Patent and Trademark Office*